INVENTOR.
Peter Zernov
BY
Quarles & French
Attys.

United States Patent Office 2,703,263
Patented Mar. 1, 1955

2,703,263

CONNECTING ROD

Peter Zernov, Milwaukee, Wis., assignor to Mercury Engineering Corporation, Milwaukee, Wis., a corporation of Wisconsin Application November 14, 1952, Serial No. 320,595

4 Claims. (Cl. 308—74)

The invention relates to connecting rods and to a method of making the same and more particularly to the bearing portion of such rods.

In the making of connecting rods the rod is usually cast as a one piece member with an elliptical hole at the big end bearing portion. To form the big end bearing the rod is cut through on the approximate center of the elliptical hole to form a two piece bearing of the main rod and the separated cap. Thereafter the cut surfaces on the rod and cap are carefully machined and fitted together, the holes for the clamping bolts drilled, and the two parts clamped together, and then the bearing hole is bored and finished by grinding if necessary. The above procedure involves considerable time and labor expense. The object of this invention is to simplify the making of the big end bearing and reduce the time and labor expense involved therein. According to the present invention, the connecting rod whose big end is cast in one piece is first bored out to its finished hole dimension, and then other operations are performed as hereinafter described which permit separation of the cap portion of the rod from the big end and still leave the finished bore in its true form when the cap is clamped in position.

A further object of the invention is to provide a connecting rod having a big end bearing whose parts are separated from each other by bearing members or dowels clamped between them and acting to preserve the true circular form of the bearing bore.

The invention further consists in the several features hereinafter described and more particularly defined by the claims at the conclusion hereof.

Figure 1:
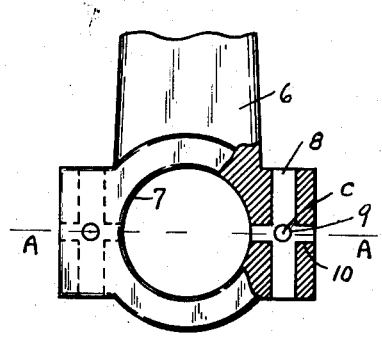
Fig. 1 is a side elevation view of the big end bearing of a connecting rod at an intermediate stage of its making, parts being broken away and parts being shown in section.
Figure 2:
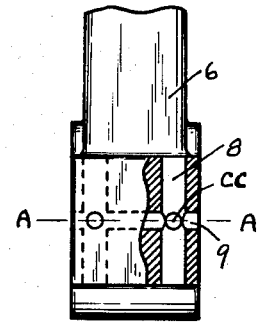
Fig. 2 is an end view of the bearing shown in Fig. 1.
Figure 3:
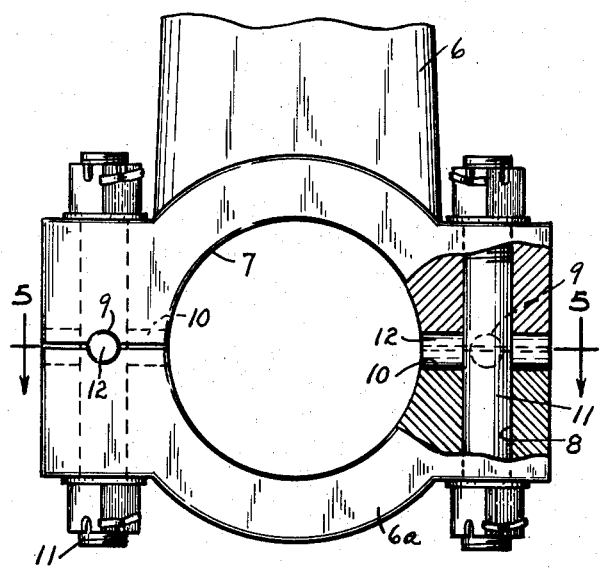
Fig. 3 is a side elevation view of the big end bearing of a connecting rod embodying the invention, parts being broken away and parts being shown in section.
Figure 4:
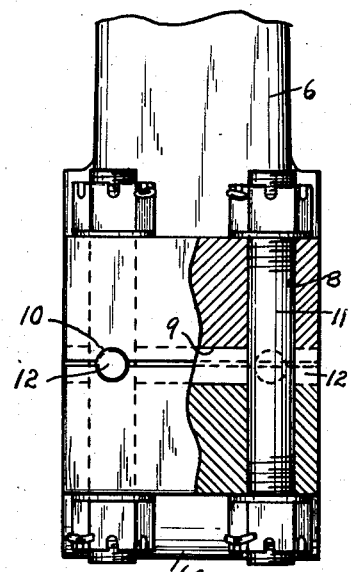
Fig. 4 is an end view of the bearing.

Referring to Figs. 1 and 2, the numeral 6 designates the big end bearing portion of a connecting rod which is formed as a one piece cast metal structure with a bearing opening.

According to my method, the bearing opening is first bored out to its finished hole dimensions to form the bearing bore or hole 7. Thereafter the rod is subjected to a number of drilling and reaming operations to provide clamping bolt holes 8, longitudinally extending holes 9, and in some instances cross holes 10, the exact order of performing these drilling operations being immaterial.

The holes 9 are drilled and reamed to extend parallel to the bore 7 and with their centers C in a plane A—A passing substantially through the center of the hole 7 on its horizontal axis. The centers of the holes 9 also preferably intersect the centers of the vertically disposed bolt holes 8.

The cross holes 10 are drilled and reamed on centers CC in the same plane A—A as that of the holes 9 and intersect the centers of the bolt holes 8.

Thereafter the cap portion 6a of the rod is separated from the main portion by sawing through the bearing on the plane A—A. This sawing or separating operation removes a certain amount of stock leaving a clearance between the parts of the bearing so that the opposed surfaces of these parts are not in contact when they are clamped together by the bolts 11.

Figure 5:
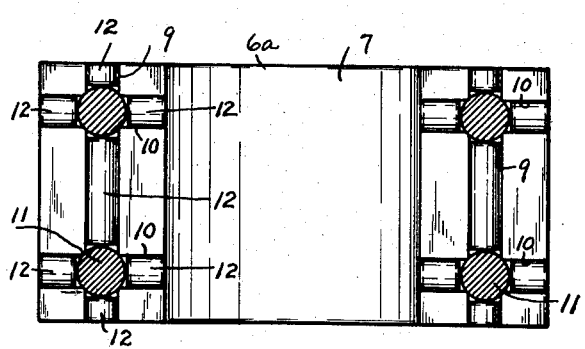
Fig. 5 is a horizontal sectional view taken on the line 5—5 of Fig. 3.

To complete the bearing a series of plain cylindrical metal pins or dowels 12 of substantially the same dimensions as the holes 9 and 10 and disposed relative to the bolts 11, as shown in Fig. 5, are placed in position, and then when the bolts 11 are tightened, these pins form the abutting surfaces between the parts of the bearing and hold these parts together in the same relation as before their separation so that the bore 7 is still in its substantially true circular form. If desired, after the finished parts have been assembled together, the bore 7 may be given a finished grinding.

Where the metal of the rod is stiff enough to resist distortion under clamping pressure of the bolts 11, the holes 10 with the pins 12 may be omitted.

The bore 7 may be fitted with other parts such as bearing shell or ball bearings.

I desire it to be understood that this invention is not to be limited to any specific details heretofore given except in so far as such details are included in the claims.

What I claim as my invention is:

1. The method of forming a bearing portion of a connecting rod which comprises taking a connecting rod having an integral end portion and boring out the bearing hole to finished dimensions, then drilling this end of the rod to provide holes for the rod bolts and drilling and reaming holes extending substantially parallel to the bearing hole and whose centers are substantially in the plane passing through the center of said bearing hole on its horizontal axis and are substantially alined with the center holes for the rod bolts, separating the cap portion of the bearing by removing metal in the plane passing through the horizontal axis of the bearing hole, inserting cylindrical metal pins of substantially the same diameter as the holes drilled and reamed parallel to the bearing in these holes and clamping the separated parts of the bearing and said pins together by the rod bolts passing through the rod holes.

2. The method of forming a bearing portion of a connecting rod which comprises taking a connecting rod having an integral end portion and boring out the bearing bore to finished dimensions, then drilling this end of the rod to provide holes for the rod bolts, drilling and reaming holes extending substantially parallel to the bearing hole and whose centers are substantially in the plane passing through the center of said bearing bore on its horizontal axis and are substantially alined with the center holes for the rod bolts, and drilling and reaming holes extending at right angles to the rod bolt holes and said second named holes and the bearing bore and whose centers also lie in the horizontal plane passing through the center of said bearing bore, separating the cap portion of the bearing by removing metal in the said horizontal plane, inserting cylindrical metal pins of substantially the same diameter as the holes drilled and reamed parallel and at right angles to the bearing bore in these holes, and clamping the separated parts of the bearing and said pins together by the rod bolts passing through said rod holes.

3. A connecting rod having an end provided with a bearing bore having a separable cap and bolt holes, bolts extending through said holes for clamping said cap to the main portion of the rod, the parts of said end having complementary semi-circular grooves extending parallel to the bearing bore and intersecting the centers of said holes, and pins mounted in said grooves and clamped in position by said bolts, the centers of said pins being disposed substantially in a plane passing through the horizontal axis of said bearing bore, said pins separating the rod from its cap but maintaining the bearing parts of said rod and cap in true centered relation with each other.

4. A connecting rod having an end provided with a bearing bore having a separable cap and bolt holes, bolts extending through said holes for clamping said cap to the main portion of the rod, the parts of said end having complementary semi-circular grooves extending parallel to the bearing bore and intersecting the centers of said holes and having complementary semi-circular grooves extending at right angles to said first named grooves and said bearing bore, and pins mounted in said complementary grooves and clamped in position by said bolts, the centers of said pins being disposed substantially in a plane passing through the horizontal axis of said bearing bore, said pins separating the rod from its cap but maintaining the bearing parts of said rod and cap in true centered relation with each other.

References Cited in the file of this patent

UNITED STATES PATENTS

| | | |
|---|---|---|
| Re. 14,580 | Layman | Dec. 31, 1918 |
| 1,350,177 | Pribil | Aug. 17, 1920 |
| 1,831,430 | Weis | Nov. 10, 1931 |
| 2,272,118 | Imse et al. | Feb. 3, 1942 |
| 2,553,935 | Parks et al. | May 22, 1951 |
| 2,588,666 | Slemmons | Mar. 11, 1952 |
| 2,624,105 | Virtue | Jan. 6, 1953 |